United States Patent
Sun et al.

(10) Patent No.: US 10,827,393 B2
(45) Date of Patent: Nov. 3, 2020

(54) VOICE CALL PROCESSING METHOD AND TERMINAL DEVICE

(71) Applicant: HUAWEI TECHNOLOGIES CO., LTD., Guangdong (CN)

(72) Inventors: Bing Sun, Beijing (CN); Hong Li, Beijing (CN); Lin Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 16/051,997

(22) Filed: Aug. 1, 2018

(65) Prior Publication Data

US 2018/0343592 A1 Nov. 29, 2018

Related U.S. Application Data

(63) Continuation of application No. PCT/CN2016/073047, filed on Feb. 1, 2016.

(51) Int. Cl.
| | |
|---|---|
| *H04W 48/18* | (2009.01) |
| *H04W 36/00* | (2009.01) |
| *H04M 7/12* | (2006.01) |
| *H04W 8/08* | (2009.01) |
| *H04W 36/14* | (2009.01) |
| *H04W 36/16* | (2009.01) |

(Continued)

(52) U.S. Cl.
CPC ..... *H04W 36/0022* (2013.01); *H04M 7/1235* (2013.01); *H04W 8/08* (2013.01); *H04W 36/14* (2013.01); *H04W 36/165* (2013.01); *H04W 36/26* (2013.01); *H04W 36/38* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 2010/0113010 A1 | 5/2010 | Tenny et al. | |
| 2010/0265914 A1 | 10/2010 | Song et al. | |
| (Continued) | | | |

FOREIGN PATENT DOCUMENTS

| | | |
|---|---|---|
| CN | 101854686 A | 10/2010 |
| CN | 102405671 A | 4/2012 |
| (Continued) | | |

OTHER PUBLICATIONS

Miikka Poikselk et al., "VoLTE End to End and Signalling," In: "Voice Over LTE", Feb. 1, 2012, John Wiley and Sons, Ltd., Chichester, UK, XP055082307, pp. 99-215.

(Continued)

*Primary Examiner* — Kodzovi Acolatse
(74) *Attorney, Agent, or Firm* — Conley Rose, P.C.

(57) ABSTRACT

The present disclosure provides a voice call processing method and a terminal device. The method includes: when a terminal meets at least one of two preset conditions, performing handover from a Long Term Evolution LTE network currently accessed by the terminal to a non-LTE standard network, and performing a circuit switched CS voice call process on the non-LTE standard network. The voice call processing method provided in embodiments of the present invention increases a voice call completion rate of a terminal and meets a user experience requirement.

17 Claims, 8 Drawing Sheets

(51) Int. Cl.
*H04W 36/26* (2009.01)
*H04W 36/38* (2009.01)

(56) References Cited

U.S. PATENT DOCUMENTS

| | | | |
|---|---|---|---|
| 2010/0297979 A1* | 11/2010 | Watfa | H04W 8/205 |
| | | | 455/404.1 |
| 2011/0028120 A1* | 2/2011 | Wu | H04W 36/0022 |
| | | | 455/404.1 |
| 2011/0122862 A1 | 5/2011 | Yun et al. | |
| 2011/0171926 A1* | 7/2011 | Faccin | H04W 48/18 |
| | | | 455/404.1 |
| 2012/0064884 A1* | 3/2012 | Ramachandran | |
| | | | H04W 36/0022 |
| | | | 455/422.1 |
| 2012/0087340 A1* | 4/2012 | Yang | H04W 36/0022 |
| | | | 370/331 |
| 2013/0100795 A1* | 4/2013 | Zhao | H04W 36/0016 |
| | | | 370/216 |
| 2015/0078337 A1 | 3/2015 | Kim | |
| 2015/0172962 A1 | 6/2015 | Watfa et al. | |
| 2016/0105790 A1 | 4/2016 | Shu | |
| 2016/0183156 A1* | 6/2016 | Chin | H04W 36/0022 |
| | | | 370/331 |
| 2016/0278132 A1* | 9/2016 | Baek | H04W 4/90 |
| 2016/0337908 A1* | 11/2016 | Poikselka | H04W 4/90 |
| 2018/0124764 A1* | 5/2018 | Lee | H04W 72/0406 |

FOREIGN PATENT DOCUMENTS

| | | |
|---|---|---|
| CN | 102457926 A | 5/2012 |
| EP | 2277342 B1 | 1/2012 |
| WO | 2013066060 A1 | 5/2013 |
| WO | 2014201630 A1 | 12/2014 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 13)," 3GPP Standard; 3GPP TS 24.301 V13.1.0, Mar. 20, 2015, pp. 1-384, XP050927892.

Partial Supplementary European Search Report, dated Oct. 17, 2018, in European Application No. 16888617.4 (14 pp.).

"3GPP TS 24.301 V13.4.0 (Dec. 2015), 3rd Generation Partnership Project; Technical Specification Group Core Network and Terminals; Non-Access-Stratum (NAS) protocol for Evolved Packet System (EPS); Stage 3 (Release 13), 400 pages".

"3GPP TS 24.008 V13.4.0 (Dec. 2015), 3rd Generation Partnership Project; Technical Specification Group Core Network and Terminals; Mobile radio interface Layer 3 specification; Core network protocols; Stage 3 (Release 13), 733 pages".

International Search Report dated Oct. 26, 2016 in corresponding International Patent Application No. PCT/CN2016/073047.

Written Opinion of the International Searching Authority dated Oct. 26, 2016 in corresponding International Patent Application No. PCT/CN2016/073047.

* cited by examiner

When a terminal meets at least one of two preset conditions, performing handover from a Long Term Evolution LTE network currently accessed by the terminal to a non-LTE standard network — 101

The terminal performs a circuit switched (Circuit Switched, CS for short) voice call process on the non-LTE standard network — 102

VOICE CALL PROCESSING METHOD AND TERMINAL DEVICE

CROSS-REFERENCE TO RELATED APPLICATIONS

This application is a continuation of International Application No. PCT/CN2016/073047, filed on Feb. 1, 2016, the disclosure of which is hereby incorporated by reference in its entirety.

TECHNICAL FIELD

The present disclosure relates to communications technologies, and in particular, to a voice call processing method and a terminal device.

BACKGROUND

Currently, with popularization of smartphones, competition between smartphone manufacturers is increasingly fierce, and competition in hardware configuration is gradually upgraded to competition in user experience. A voice call completion rate is a key indicator of user experience. Therefore, it is particularly important to increase a voice call completion rate of a smartphone.

In the prior art, a mainstream voice solution used in Long Term Evolution (LTE for short) is a Voice over LTE (VoLTE for short) technology. A main idea of the method is to use an Internet Protocol (IP for short) bearer channel that is provided by an LTE wireless network and an evolved packet core (EPC for short) network, to access an IP multimedia subsystem (IMS for short) core network. An IMS-related service platform provides voice service call processing.

However, according to the VoLTE method in the prior art, when a terminal is in a limited service state on an LTE network, and the LTE network receives a voice call request from another user and sends the request to the terminal, only an emergency service is provided in VoLTE because the terminal is in the limited service state of the LTE network, and the terminal in a VoLTE state ignores the voice call request. Consequently, the another user cannot successfully call the terminal, thereby reducing a voice call completion rate of a smartphone and causing poor user experience.

SUMMARY

A voice call processing method and a terminal device of the embodiments of the present disclosure resolve a prior-art technical problem of a low call completion rate that is caused when a VoLTE method is used to perform a voice call and a terminal is in a limited service state on an LTE network.

According to a first aspect, the present embodiments provide a voice call processing method, including: when a terminal meets at least one of two preset conditions, performing handover from a Long Term Evolution LTE network currently accessed by the terminal to a non-LTE standard network, where the two preset conditions include:

condition 1: receiving a voice paging request sent by the LTE network in a limited service state of the LTE network, where the voice paging request is used to call the terminal to perform a voice call, and only an emergency call service is supported in the limited service state of the LTE network; and condition 2: sending an extended service request to the LTE network and receiving a reject message corresponding to the extended service request, where the extended service request is used to request the LTE network to redirect or hand over the terminal to a network of a communications standard other than the LTE network; and performing a circuit switched CS voice call process on the non-LTE standard network.

According to the voice call processing method provided in the first aspect, when the terminal meets at least one of the two preset conditions, the terminal performs handover from the Long Term Evolution LTE network currently accessed by the terminal to the non-LTE standard network and performs the circuit switched CS voice call process on the non-LTE standard network, to implement the voice call. Therefore, the voice call processing method provided in an embodiment of the present invention increases a voice call completion rate of the terminal and meets a user experience requirement.

In a first possible implementation of the first aspect, when condition 1 is met, the performing handover from an LTE network currently accessed by the terminal to a non-LTE standard network includes:

in response to the voice paging request, proactively choosing, by the terminal, to hand over to the currently accessible non-LTE standard network; and the method further includes: returning, by the terminal, a voice paging response to the non-LTE standard network.

According to the method provided in the first possible implementation, in response to the voice paging request, the terminal proactively chooses to hand over to the currently accessible non-LTE standard network, and returns the voice paging response to the non-LTE standard network, so that the terminal can rapidly access the non-LTE standard network.

In a second possible implementation of the first aspect, when condition 1 is met, the performing handover from an LTE network currently accessed by the terminal to a non-LTE standard network includes:

in response to the voice paging request, sending, by the terminal, the extended service request to the LTE network, and redirecting or handing over, according to an instruction of the LTE network, the terminal from the LTE network to the accessible non-LTE standard network; and the method further includes: returning, by the terminal, a voice paging response to the non-LTE standard network.

According to the method provided in the second possible implementation, in response to the voice paging request, the terminal sends the extended service request to the LTE network, redirects or hands over, under the instruction of the LTE network, the terminal from the LTE network to the accessible non-LTE standard network; and returns the voice paging response to the non-LTE standard network, so that the terminal can accurately access the available non-LTE standard network.

In a third possible implementation of the first aspect, when condition 1 is met, the terminal in the limited service state on an LTE network is on an LTE network cell providing a limited service and establishes an emergency call bearer only with the LTE network.

According to the method provided in the third possible implementation, when condition 1 is met, the terminal in the limited service state of the LTE network camps on the an LTE network cell providing a limited service and establishes the emergency call bearer only with the LTE network, to ensure call quality of an emergency call of the LTE network.

In a fourth possible implementation of the first aspect, when condition 1 is met, the performing a CS voice call process on the non-LTE standard network includes:

in response to the voice paging request, performing a CS voice call reply process on the non-LTE standard network.

According to the method provided in the fourth possible implementation, when condition 1 is met, in response to the voice paging request, the terminal performs the CS voice call reply process on the non-LTE standard network, to implement the voice call of the terminal.

In a fifth possible implementation of the first aspect, when condition 2 is met, the reject message includes a reject cause indicator value indicating that a CS domain is unavailable.

According to the method provided in the fifth possible implementation, when condition 2 is met, the reject message includes the reject cause indicator value indicating that the CS domain is unavailable. In this case, the terminal can perform corresponding processing according to the reject cause value in the reject message.

In a sixth possible implementation of the first aspect, when condition 2 is met, the performing a CS voice call process on the non-LTE standard network includes: proactively initiating the CS voice call process on the non-LTE standard network.

According to the method provided in the sixth possible implementation, when condition 2 is met, the terminal proactively initiates the CS voice call process on the non-LTE standard network, to implement the voice call of the terminal.

Optionally, the non-LTE standard network includes a 2G network or a 3G network.

According to a second aspect, the present embodiments provide a terminal device, including:

a determining module, configured to when at least one of two preset conditions is met, perform handover from a Long Term Evolution LTE network currently accessed by the terminal device to a non-LTE standard network, where the two preset conditions include:

condition 1: receiving a voice paging request sent by the LTE network in a limited service state of the LTE network, where the voice paging request is used to call the terminal device to perform a voice call, and only an emergency call service is supported in the limited service state of the LTE network; and condition 2: sending an extended service request to the LTE network and receiving a reject message corresponding to the extended service request, where the extended service request is used to request the LTE network to redirect or hand over the terminal device to a network of a communications standard other than the LTE network; and a voice call module, configured to perform a circuit switched CS voice call process on the non-LTE standard network.

In a first possible implementation of the second aspect, the determining module is specifically configured to:

when condition 1 is met, in response to the voice paging request, proactively choose to hand over to the currently accessible non-LTE standard network; and return a voice paging response to the non-LTE standard network.

In a second possible implementation of the second aspect, the determining module is specifically configured to:

when condition 1 is met, in response to the voice paging request, send the extended service request to the LTE network, and redirect or hand over, according to an instruction of the LTE network, from the LTE network to the accessible non-LTE standard network; and return a voice paging response to the non-LTE standard network.

In a third possible implementation of the second aspect, when condition 1 is met, the terminal device in the limited service state of the LTE network camps om an LTE network cell providing a limited service and establishes an emergency call bearer only with the LTE network.

In a fourth possible implementation of the second aspect, the voice call module is specifically configured to:

when condition 1 is met, in response to the voice paging request, perform a CS voice call reply process on the non-LTE standard network.

In a fifth possible implementation of the second aspect, when condition 2 is met, the reject message includes a reject cause indicator value indicating that a CS domain is unavailable.

In a sixth possible implementation of the second aspect, the voice call module is specifically configured to:

when condition 2 is met, proactively initiate the CS voice call process on the non-LTE standard network.

Optionally, the non-LTE standard network includes a 2G network or a 3G network.

For beneficial effects brought by the second aspect and the possible implementations of the second aspect, correspondingly refer to the beneficial effects brought by the first aspect and the possible implementations of the first aspect. Details are not described herein again.

According to a third aspect, the present embodiments provide a terminal device, including:

a processor, and a memory configured to store an instruction that is executed by the processor, where the processor and the memory are coupled with each other by using a system bus, and the processor is configured to read the instruction from the memory.

Optionally, the processor is a communications baseband processor.

The processor is configured to perform the following operations when performing the instruction:

when at least one of two preset conditions is met, performing handover from a Long Term Evolution LTE network currently accessed by the terminal device to a non-LTE standard network, where the two preset conditions include:

condition 1: receiving a voice paging request sent by the LTE network in a limited service state of the LTE network, where the voice paging request is used to call the terminal to perform a voice call, and only an emergency call service is supported in the limited service state of the LTE network; and condition 2: sending an extended service request to the LTE network and receiving a reject message corresponding to the extended service request, where the extended service request is used to request the LTE network to redirect or hand over the terminal to a network of a communications standard other than the LTE network; and performing a circuit switched CS voice call process on the non-LTE standard network.

For beneficial effects brought by the implementation of the third aspect, correspondingly refer to the beneficial effects brought by the implementations of the first aspect. Details are not described herein again.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the aspects, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figures 1, 2:
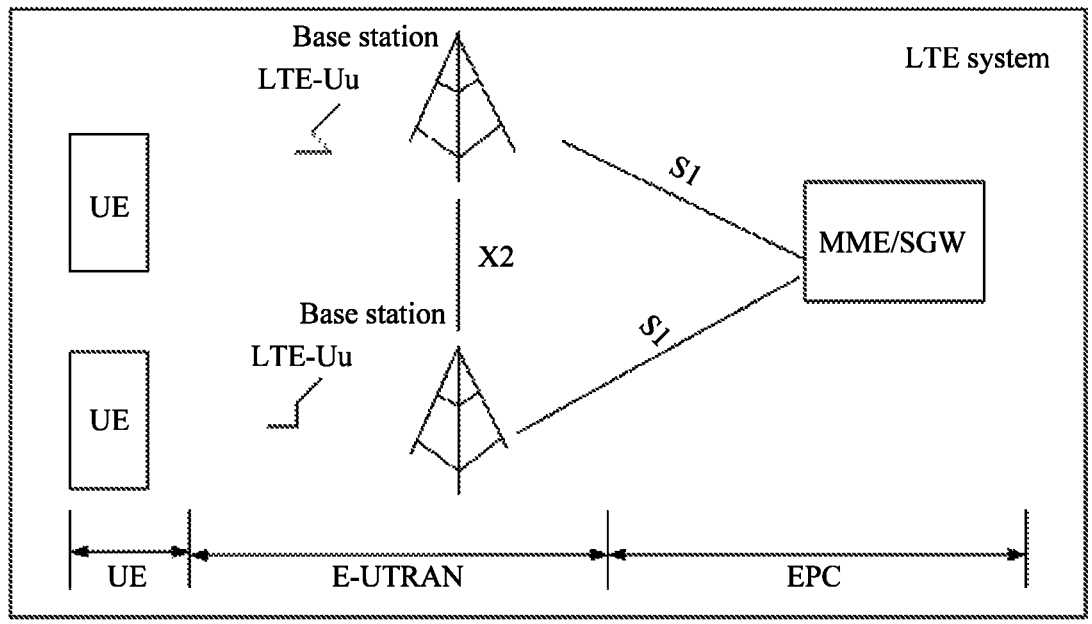
FIG. 1 is a schematic architecture diagram of an LTE system according to an embodiment of the present invention.
FIG. 2 is a flowchart of Embodiment 1 of a voice call processing method according to the embodiments of the present invention.

A voice call processing method and a terminal device in the embodiments of the present invention may be applicable to a network architecture of an LTE system, or may be applicable to a network architecture of a next generation (4.5G or 5G) communications system. FIG. 1 is a schematic architecture diagram of an LTE system according to an embodiment of the present invention. As shown in FIG. 1, the LTE system is used as an example, and the LTE system includes user equipment, an evolved Node B (eNodeB for short), and an evolved packet core (EPC for short). The EPC is responsible for a core network part, a mobility management entity (MME for short) is responsible for a signaling processing part, a serving gateway (S-GW for short) is responsible for a data processing part, and the eNodeB is responsible for an access network part. The access network part is also referred to as an evolved UMTS terrestrial radio access network (Evolved UTRAN). The LTE system supports an interoperation with another 3GPP system, and the LTE system is divided into a frequency division duplexing-LTE (FDD-LTE for short) system and a time division duplexing-LTE (TDD-LTE for short) system according to different duplex modes. A terminal in this embodiment of the present invention may be a smartphone or may be a wearable device.

A mobile switching center (MSC for short) in this embodiment of the present invention is a place that provides a call transfer service and call control between a telephone and a data system.

The voice call processing method and terminal device provided in the embodiments of the present invention are intended to resolve a prior-art technical problem of a low call completion rate that is caused when a VoLTE method is used to perform a voice call and a terminal is in a limited service state on an LTE network.

The following describes the technical solutions of the present invention in detail by using specific embodiments. The following several specific embodiments may be combined with each other, and same or similar concepts or processes may not be repeated in some embodiments.

FIG. 2 is a flowchart of Embodiment 1 of a voice call processing method according to the embodiments of the present invention. As shown in FIG. 2, the method includes the following steps.

Step 101. When a terminal meets at least one of two preset conditions, performing handover from a Long Term Evolution LTE network currently accessed by the terminal to a non-LTE standard network.

In this embodiment, the non-LTE standard network may be a second-generation wireless telephone technology 2G for short) network, or a third-generation wireless telephone technology (3G for short) network, but no limitation is set thereto.

The two preset conditions include:

condition 1: receiving a voice paging request sent by the LTE network in a limited service state of the LTE network, where the voice paging request is used to call the terminal to perform a voice call, and only an emergency call service is supported in the limited service state of the LTE network; and condition 2: sending an extended service request to the LTE network and receiving a reject message corresponding to the extended service request, where the extended service request is used to request the LTE network to redirect or hand over the terminal to a network of a communications standard other than the LTE network.

In this embodiment, for example, when a voice service of a terminal A is in the limited service state of the LTE network and only an emergency call service is supported, the LTE network on which the terminal A currently resides receives a request of a terminal B for voice paging to the terminal A. In this case, the terminal A meets condition 1. When the terminal A needs to call the terminal B, the terminal A sends an extended service request to the LTE network on which the terminal A currently resides and receives a reject message corresponding to the extended service request. In this case, the terminal A meets condition 2.

Step 102. The terminal performs a circuit switched (CS for short) voice call process on the non-LTE standard network.

In this embodiment, the circuit switched (CS for short) voice call process is performed on the non-LTE standard network, so as to perform the voice call.

In this embodiment, when the terminal meets the at least one of the two preset conditions, the terminal performs handover from the Long Term Evolution LTE network currently accessed by the terminal to the non-LTE standard network and performs the circuit switched CS voice call process on the non-LTE standard network. Condition 1 is: receiving a voice paging request sent by the LTE network in a limited service state of the LTE network, where the voice paging request is used to call the terminal to perform a voice call, and only an emergency call service is supported in the limited service state of the LTE network. Condition 2 is: sending an extended service request to the LTE network and receiving a reject message corresponding to the extended service request, where the extended service request is used to request the LTE network to redirect or hand over the terminal to a network of a communications standard other than the LTE network. In this case, when the terminal meets the at least one of the two conditions, a normal voice call is performed, avoiding a prior-art problem that a terminal cannot perform a voice call when the terminal meets any preset condition, thereby improving a voice call completion rate of the terminal and meeting a user experience requirement.

Figure 3:
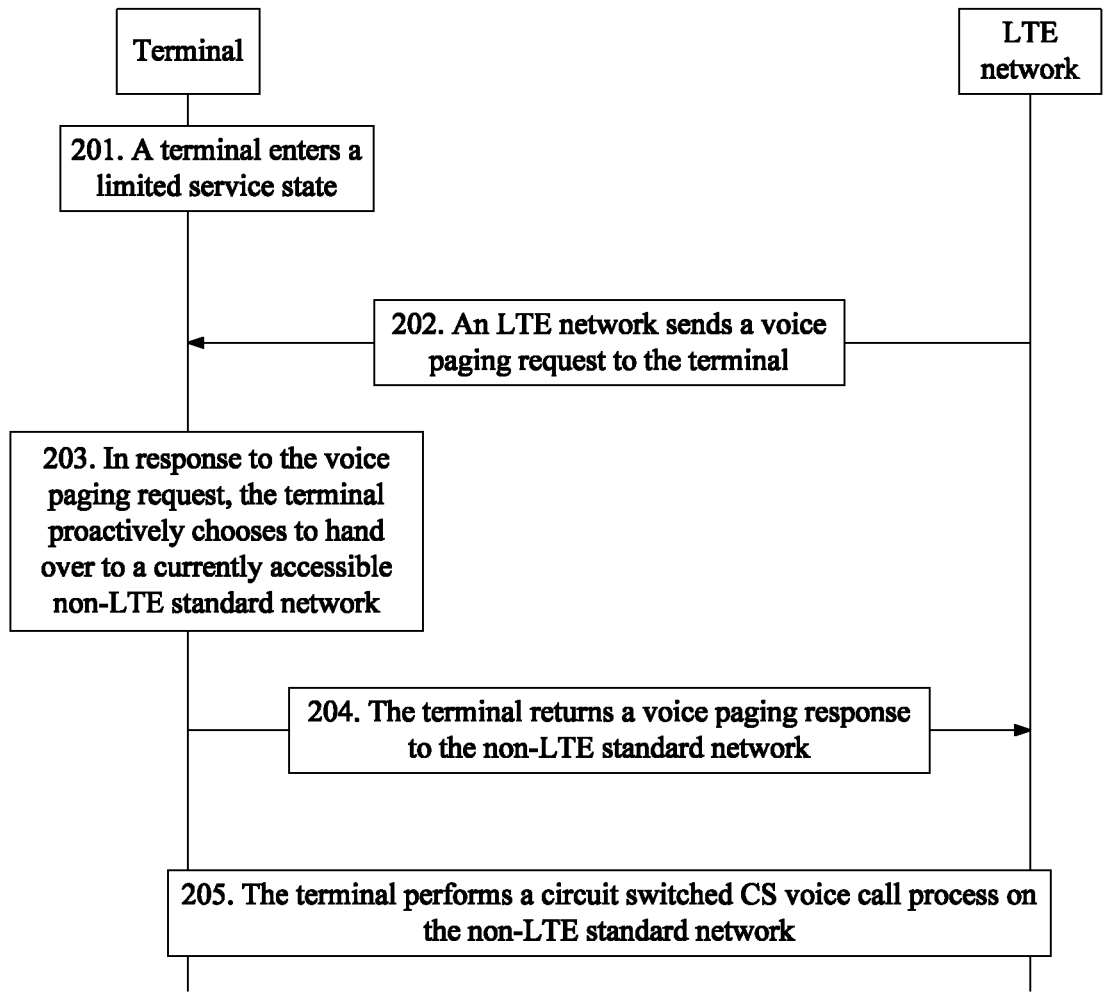
FIG. 3 is a signaling diagram of Embodiment 2 of a voice call processing method according to the embodiments of the present invention.

FIG. 3 is a signaling diagram of Embodiment 2 of a voice call processing method according to the embodiments of the present invention. As shown in FIG. 3, the method includes the following steps.

Step 201. A terminal is in a limited service state on an LTE network.

In this embodiment, specifically, the terminal receives a voice paging request sent by the LTE network in the limited service state of the LTE network, where the voice paging request is used to call the terminal to perform a voice call, and only an emergency call service is supported in the limited service state of the LTE network.

In addition, it should be noted that, the terminal in the limited service state of the LTE network is in an LTE network cell providing a limited service and establishes an emergency call bearer only with the LTE network.

Step 202. The LTE network sends a voice paging request to the terminal.

Step 203. In response to the voice paging request, the terminal proactively chooses to hand over to a currently accessible non-LTE standard network.

Step 204. The terminal returns a voice paging response to the non-LTE standard network.

Step 205. The terminal performs a circuit switched CS voice call process on the non-LTE standard network.

In this embodiment, specifically, in response to the voice paging request, the terminal performs a CS voice call reply process on the non-LTE standard network.

In this embodiment, in response to the voice paging request, the terminal proactively chooses to hand over to the currently accessible non-LTE standard network, and returns the voice paging response to the non-LTE standard network, so that the terminal can rapidly access the non-LTE standard network.

Figure 4:
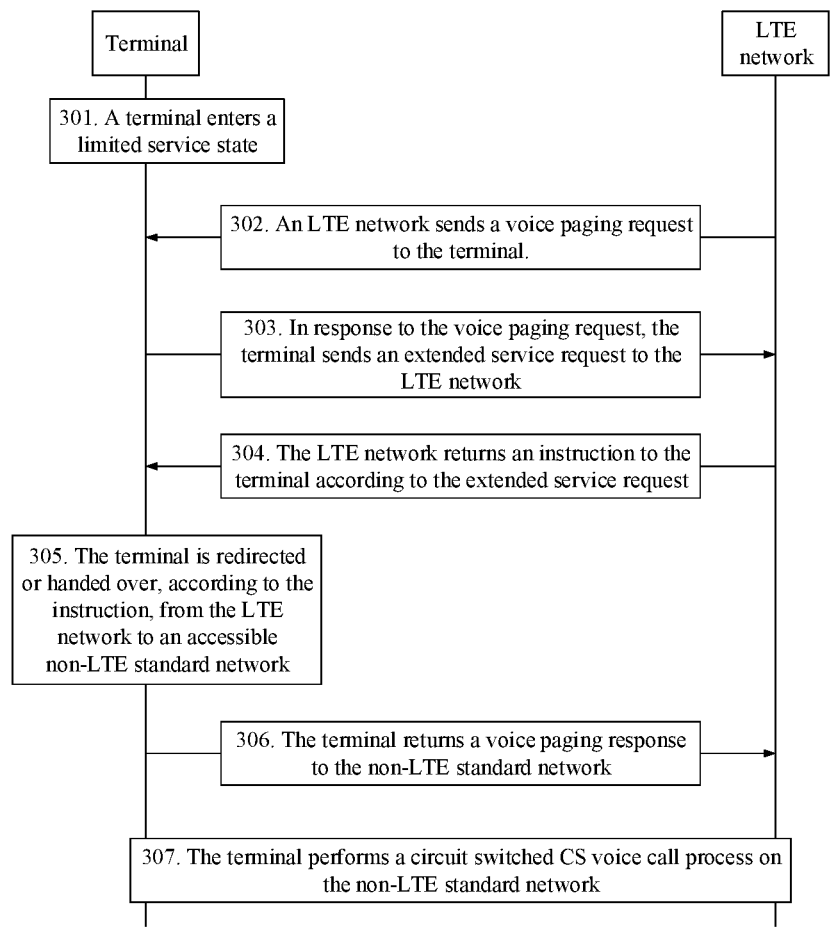
FIG. 4 is a signaling diagram of Embodiment 3 of a voice call processing method according to the embodiments of the present invention.

FIG. 4 is a signaling diagram of Embodiment 3 of a voice call processing method according to the embodiments of the present invention. As shown in FIG. 4, the method includes the following steps.

Step 301. A terminal is in a limited service state on an LTE network.

Step 302. The LTE network sends a voice paging request to the terminal.

Step 303. In response to the voice paging request, the terminal sends an extended service request to the LTE network.

Step 304. The LTE network returns an instruction to the terminal according to the extended service request.

Step 305. The terminal is redirected or handed over, according to the instruction, from the LTE network to an accessible non-LTE standard network.

Step 306. The terminal returns a voice paging response to the non-LTE standard network.

Step 307. The terminal performs a circuit switched CS voice call process on the non-LTE standard network.

In this embodiment, specifically, in response to the voice paging request, the terminal performs a CS voice call reply process on the non-LTE standard network.

In this embodiment, in response to the voice paging request, the terminal sends the extended service request to the LTE network; and the terminal is redirected or handed over, according to the instruction of the LTE network, from the LTE network to the accessible non-LTE standard network, and returns the voice paging response to the non-LTE standard network, so that the terminal can accurately access the available non-LTE standard network.

Figure 5:
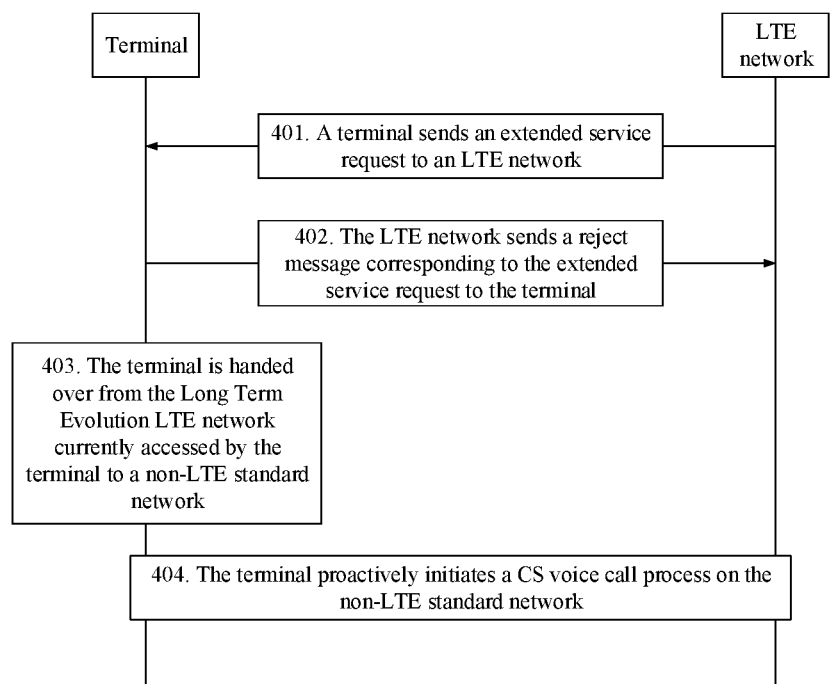
FIG. 5 is a signaling diagram of Embodiment 4 of a voice call processing method according to the embodiments of the present invention.

FIG. 5 is a signaling diagram of Embodiment 4 of a voice call processing method according to the embodiments of the present invention. As shown in FIG. 5, the method includes the following steps.

Step 401. A terminal sends an extended service request to an LTE network.

In this embodiment, the extended service request is used to request the LTE network to redirect or hand over the terminal to a network of a communications standard other than the LTE network.

Step 402. The LTE network sends a reject message corresponding to the extended service request to the terminal.

In this embodiment, the reject message includes a reject cause indicator value indicating that a CS domain is unavailable, and specifically, the cause indicator value is 18.

Step 403. The terminal is handed over from the Long Term Evolution LTE network currently accessed by the terminal to a non-LTE standard network.

Step 404. The terminal proactively initiates a CS voice call process on the non-LTE standard network.

In this embodiment, specifically, in response to the voice paging request, the terminal performs a CS voice call reply process on the non-LTE standard network.

In this embodiment, the terminal sends the extended service request to the LTE network and receives the reject message that is corresponding to the extended service request and that is sent by the LTE network, and in this case, the terminal is handed over from the Long Term Evolution LTE network currently accessed by the terminal to the non-LTE standard network and proactively initiates the CS voice call process on the non-LTE standard network. In this case, a voice call of the terminal is implemented, thereby improving a voice call completion rate of the terminal and meeting a user experience requirement.

Figure 6:
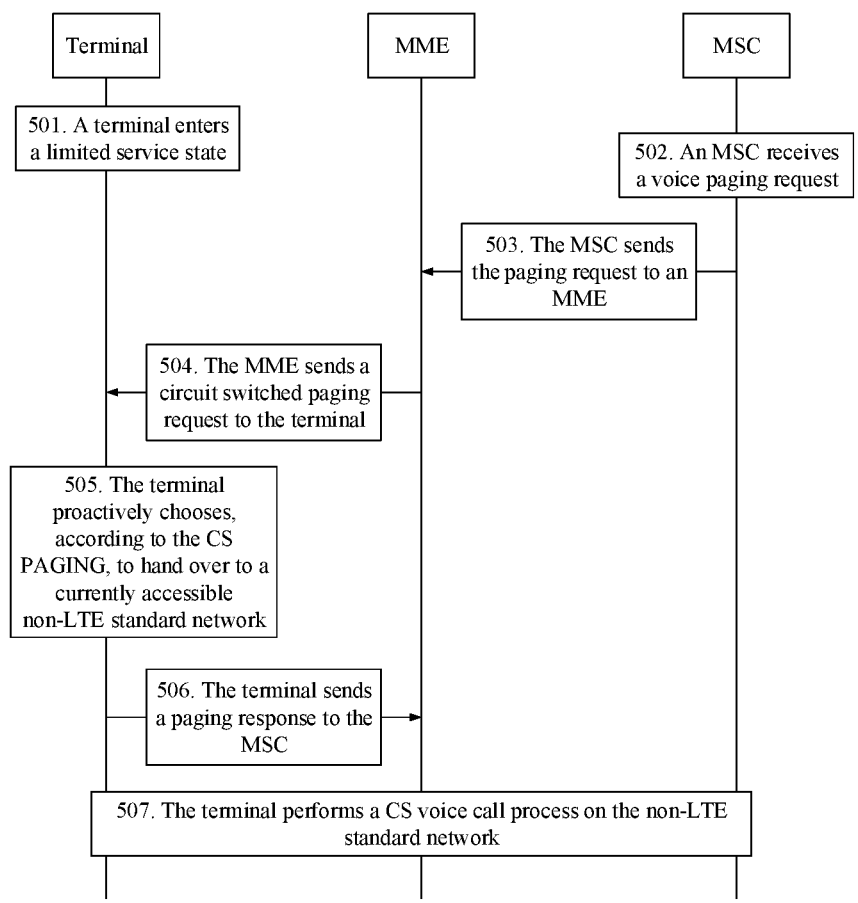
FIG. 6 is a signaling diagram of Embodiment 5 of a voice call processing method according to the embodiments of the present invention.

FIG. 6 is a signaling diagram of Embodiment 5 of a voice call processing method according to the embodiments of the present invention. As shown in FIG. 6, the method includes the following steps.

Step 501. A terminal enters a limited service state.

In this embodiment, for example, the terminal may enter the limited service state in the following manner. The terminal first sends a registration request message to an MME and an MSC and makes a VoLTE emergency call to the MME to establish an emergency bearer of the terminal; the MME sends, to the terminal, a request of releasing a common bearer; the terminal then releases the common bearer and sends a request of hanging up the VoLTE emergency call to an LTE network; the LTE network releases a link after receiving the request of hanging up the VoLTE emergency call; and the terminal enters the limited service state.

Step 502. An MSC receives a voice paging request.

In this embodiment, for example, when a voice service of a terminal A is in a limited service state of the LTE network, the MSC receives a request of a terminal B for voice paging to the terminal A.

Step 503. The MSC sends the paging request (PAGING REQ) to an MME.

In this embodiment, the PAGING REQ includes a calling number, location area information, and the like.

Step 504. The MME sends a circuit switched paging request (CS PAGING).

Step 505. The terminal proactively chooses, according to the CS PAGING; to hand over to a currently accessible non-LTE standard network.

Step 506. The terminal sends a paging response (PAGING RSP) to the MSC.

In this embodiment, the terminal sends the paging response (PAGING RSP) to the MSC by using the non-LTE standard network.

Step 507. The terminal performs a CS voice call process on the non-LTE standard network.

In this embodiment, the terminal proactively chooses, according to the voice paging request, to hand over to the currently accessible non-LTE standard network, so that the terminal can rapidly access the non-LTE standard network.

Figure 7:
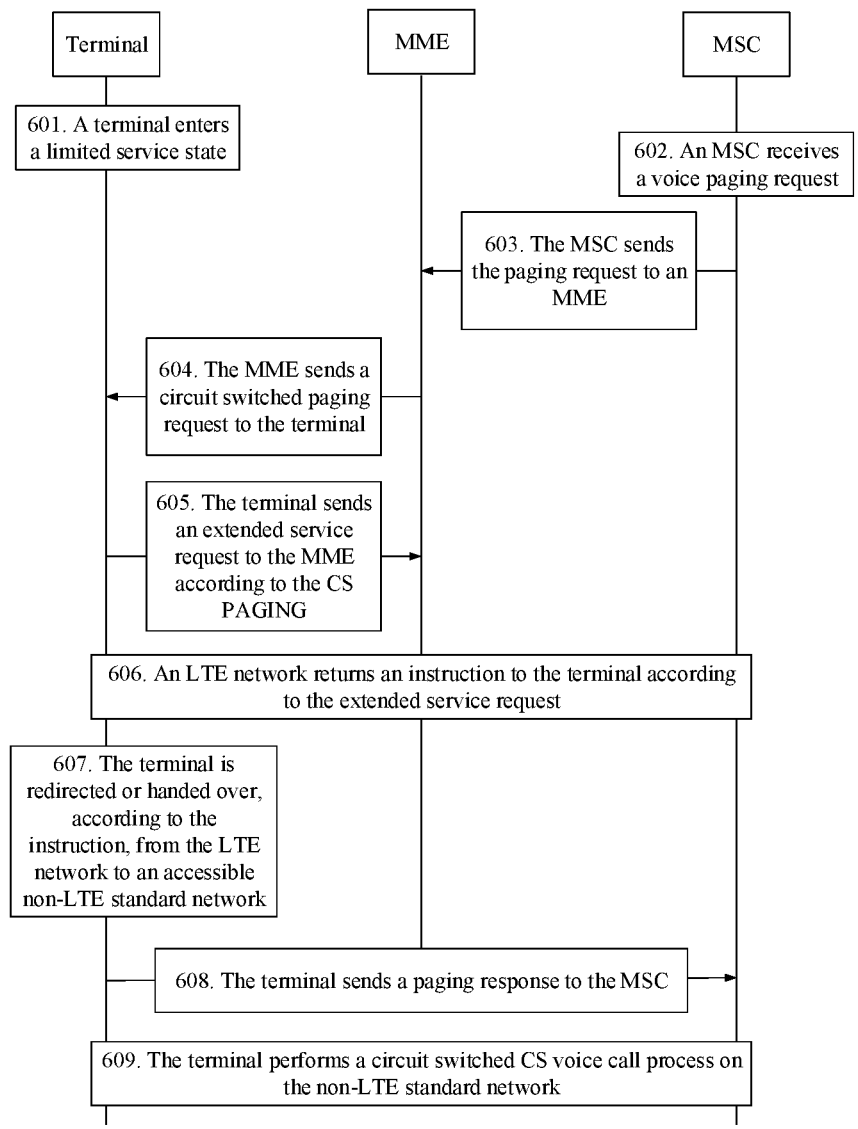
FIG. 7 is a signaling diagram of Embodiment 6 of a voice call processing method according to the embodiments of the present invention.

FIG. 7 is a signaling diagram of Embodiment 6 of a voice call processing method according to the embodiments of the present invention. As shown in FIG. 7, the method includes the following steps.

Step 601. A terminal enters a limited service state.

Step 602. An MSC receives a voice paging request.

Step 603. The MSC sends the paging request (PAGING REQ) to an MME.

Step 604. The MME sends a circuit switched paging request (CS PAGING) to the terminal.

Step 605. The terminal sends an extended service request to the MME according to the CS PAGING Step 606. An LTE network returns an instruction to the terminal according to the extended service request.

Step 607. The terminal is redirected or handed over, according to the instruction, from the LTE network to an accessible non-LTE standard network.

In this embodiment, for example, the LTE network receives the extended service request sent by the terminal, and returns a redirection instruction to the terminal side. The terminal performs a standard redirection process according to the redirection instruction to redirect the LTE network currently accessed by the terminal to an accessible non-LTE network.

Step 608. The terminal sends a paging response (PAGING RSP) to the MSC.

Step 609. The terminal performs a circuit switched CS voice call process on the non-LTE standard network.

In this embodiment, in response to the voice paging request, the terminal sends the extended service request to the LTE network; and the terminal is redirected or handed over, according to the instruction of the LTE network, from the LTE network to the accessible non-LTE standard network, and returns the voice paging response to the non-LTE standard network, so that the terminal can accurately access the available non-LTE standard network.

Figure 8:
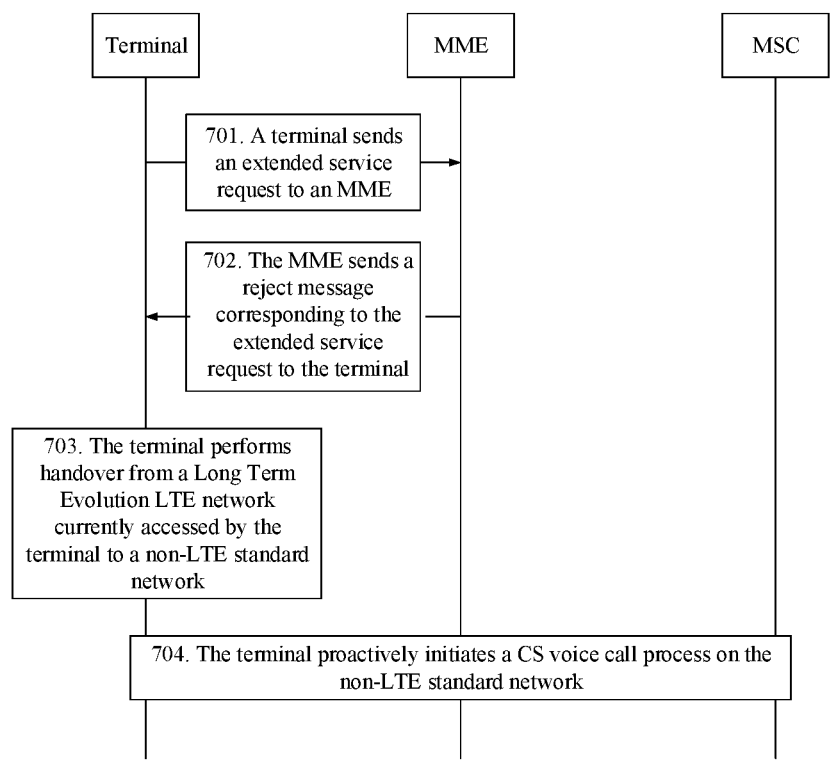
FIG. 8 is a signaling diagram of Embodiment 7 of a voice call processing method according to the embodiments of the present invention.

FIG. 8 is a signaling diagram of Embodiment 7 of a voice call processing method according to the embodiments of the present invention. As shown in FIG. 8, the method includes the following steps.

Step 701. A terminal sends an extended service request to an MME.

It should be noted that the extended service request is used to trigger an LTE network to initiate a handover (HO for short), a Cell Change Order (CCO for short), or a redirection process, to make the terminal fall back to 2G/3G.

Step 702. The MME sends a reject message corresponding to the extended service request to the terminal.

Specifically, the MME sends the reject message, that is, SERVICE REJ, that is corresponding to the extended service request to the terminal, and returns a cause value 18 of a call failure, and the cause value 18 of the call failure indicates that a circuit switched (CS for short) domain is unavailable.

Step 703. The terminal performs handover from a Long Term Evolution LTE network currently accessed by the terminal to a non-LTE standard network.

Step 704. The terminal proactively initiates a CS voice call process on the non-LTE standard network.

In this embodiment, specifically, in response to a voice paging request, the terminal performs a CS voice call reply process on the non-LTE standard network.

In this embodiment, the terminal sends the extended service request to the MME and receives the reject message that is corresponding to the extended service request and that is sent by the MME to the terminal, and in this case, the terminal performs handover from the Long Term Evolution LTE network currently accessed by the terminal to the non-LTE standard network and proactively initiates the CS voice call process on the non-LTE standard network, thereby implementing a voice call of the terminal, improving a voice call completion rate of the terminal and meeting a user experience requirement.

Figure 9:
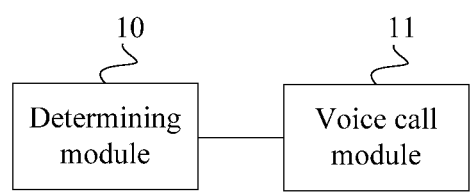
FIG. 9 is a schematic structural diagram of Embodiment 1 of a terminal device according to the embodiments of the present invention.

FIG. 9 is a schematic structural diagram of Embodiment 1 of a terminal device according to the embodiments of the present invention. As shown in FIG. 9, the terminal device includes a determining module 10 and a voice call module 11.

The determining module 10 is configured to when at least one of two preset conditions is met, perform handover from a Long Term Evolution LTE network currently accessed by the terminal device to a non-LTE standard network, where the two preset conditions include:

condition 1: receiving a voice paging request sent by the LTE network in a limited service state of the LTE network, where the voice paging request is used to call the terminal device to perform a voice call, and only an emergency call service is supported in the limited service state of the LTE network; and condition 2: sending an extended service request to the LTE network and receiving a reject message corresponding to the extended service request, where the extended service request is used to request the LTE network to redirect or hand over the terminal device to a network of a communications standard other than the LTE network.

The voice call module 11 is configured to perform a circuit switched CS voice call process on the non-LTE standard network.

The terminal device in this embodiment can perform a technical solution of the method embodiment shown in FIG. 2, an implementation principle and a beneficial effect of the terminal device are similar to those of the method embodiment shown in FIG. 2, and details are not described herein again.

Further, based on Embodiment 1, specific implementations of the determining module 10 of the terminal device provided in the present invention may be the following two manners.

One possible implementation:

the determining module 10 is specifically configured to:

when condition 1 is met, in response to the voice paging request, proactively choose to hand over to the currently accessible non-LTE standard network; and return a voice paging response to the non-LTE standard network.

The terminal device in this embodiment can execute the technical solution of the method embodiment shown in FIG. 3, the implementation principle and the advantageous effect are similar, and details are not described herein again.

Another possible implementation:

the determining module 10 is specifically configured to:

when condition 1 is met, in response to the voice paging request, send the extended service request to the LTE network, and redirect or hand over, according to an instruction of the LTE network, from the LTE network to the accessible non-LTE standard network; and return a voice paging response to the non-LTE standard network.

It should be noted that when condition 1 is met, the terminal device in the limited service state on an LTE network is on an LTE network cell providing a limited service and establishes an emergency call bearer only with the LTE network.

In addition, an implementation of the voice call module 11 is as follows:

The voice call module 11 is specifically configured to:

when condition 1 is met, in response to the voice paging request, perform a CS voice call reply process on the non-LTE standard network.

The terminal device in this embodiment can execute the technical solution of the method embodiment shown in FIG. 4, an implementation principle and a beneficial effect of the terminal device are similar to those of the method embodiment shown in FIG. 4, and details are not described herein again.

Further, based on Embodiment 1, another implementation of the voice call module 11 of the terminal device provided in the present invention is as follows:

The voice call module 11 is specifically configured to:

when condition 2 is met, proactively initiate the CS voice call process on the non-LTE standard network.

It should be noted that when condition 2 is met, the reject message includes a reject cause indicator value indicating that a CS domain is unavailable.

The terminal device in this embodiment can execute the technical solution of the method embodiment shown in FIG. 5, an implementation principle and a beneficial effect of the terminal device are similar to those of the method embodiment shown in FIG. 5, and details are not described herein again.

Figure 10:
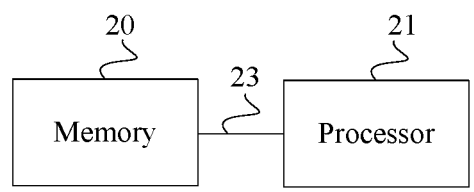
FIG. 10 is a schematic structural diagram of Embodiment 2 of a terminal device according to the embodiments of the present invention.

The foregoing schematically describes internal function modules and structures of the terminal device. FIG. 10 is a schematic structural diagram of Embodiment 2 of a terminal device according to the embodiments of the present invention. As shown in FIG. 10, the terminal device may be implemented as:

a processor 21, and a memory 20 configured to store an instruction that is executed by the processor 21, where the processor 21 and the memory 20 are coupled with each other by using a system bus 23, and the processor 21 is configured to read the instruction from the memory 20; and optionally, the processor 21 may be a communications baseband processor.

The processor 21 is configured to perform the following operations when performing the instruction:

when at least one of two preset conditions is met, hand over the terminal device from a Long Term Evolution LTE network currently accessed by the terminal device to a non-LTE standard network, where the two preset conditions include:

condition 1: receiving a voice paging request sent by the LTE network in a limited service state of the LTE network, where the voice paging request is used to call the terminal device to perform a voice call, and only an emergency call service is supported in the limited service state of the LTE network; and condition 2: sending an extended service request to the LTE network and receiving a reject message corresponding to the extended service request, where the extended service request is used to request the LTE network to redirect or hand over the terminal device to a network of a communications standard other than the LTE network; and performing a circuit switched CS voice call process on the non-LTE standard network.

It should be noted that for specific operations performed by each unit in the embodiments of the apparatuses referred to in this embodiment, refer to the descriptions of the embodiments of the foregoing methods.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may camp on one position, or may be distributed on a plurality of network units. Some or all of the units may be selected according to actual requirements to achieve the aspects of the solutions of the embodiments.

In addition, functional units in the embodiments of the present invention may be integrated into one processing unit, or each of the units may exist alone physically, or two or more units are integrated into one unit. The foregoing integrated unit may be implemented in a form of hardware, or may be implemented in a form of a software functional unit. When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A method for processing a voice call, comprising:
receiving, by a terminal in a limited service state of a long term evolution (LTE) network, a voice paging request from the LTE network wherein the voice paging request is an instruction for the terminal to perform a voice call, and wherein only an emergency call service is supported while the terminal is in the limited service state of the LTE network;
performing, by the terminal in the limited service state of the LTE network, a handover from the LTE network to a non-LTE standard network in response to receiving the voice paging request; and
performing, by the terminal, a circuit switched (CS) voice call process on the non-LTE standard network.

2. The method or claim 1, wherein performing the handover from the LTE network to the non-LTE standard network comprises proactively choosing, by the terminal, to hand over to an accessible non-LTE standard network, and wherein the method further comprises returning, by the terminal, a voice paging response to the non-LTE standard network.

3. The method of claim 1, wherein performing the handover from the LTE network to the non-LTE standard network comprises:
sending, by the terminal, an extended service request to the LTE network and
redirecting the terminal from the LTE network to an accessible non-LTE standard network according to an instruction of the LTE network, and
wherein the method further comprises returning, by the terminal, a voice paging response to the non-LTE standard network.

4. The method of claim 1, wherein the terminal in the limited service state of the LTE network camps on an LTE network cell providing a limited service and establishing only an emergency call bearer with the LTE network.

5. The method of claim 1, wherein performing the CS voice call process on the non-LTE standard network comprises performing a CS voice call reply process on the non-LTE standard network.

6. The method of claim 1, further comprising returning a voice paging response to the non-LTE standard network.

7. A terminal device, comprising:
a processor; and
a memory configured to store instructions, which when executed by the processor, cause the processor to be configured to:
receive a voice paging request received from the LTE network, wherein the terminal device is in a limited service state of a long term evolution (LTE) network, wherein the voice paging request is an instruction for the terminal to perform a voice call, and wherein only an emergency call service is supported while the terminal is in the limited service state of the LTE network;
perform a handover from the LTE network to a non-LTE standard network when the terminal device is in the limited service state of the LTE network
perform a circuit switched (CS) voice call process on the non-LTE standard network.

8. The terminal device of claim 7, wherein to perform the handover from the LTE network to the non-LTE standard network, the instructions further cause the processor to be configured to proactively choose to hand over to an accessible non-LTE standard network and wherein the instructions further cause the processor to return a voice paging response to the non-LTE standard network.

9. The terminal device of claim 7, wherein to perform the handover from the LTE network to the non-LTE standard network, the instructions further cause the processor to be configured to:
send an extended service request to the LTE network; and
redirect the terminal from the LTE network to an accessible non-LTE standard network according to an instruction of the LTE network, and
wherein the instructions further cause the processor to be configured to return a voice paging response to the non-LTE standard network.

10. The terminal device of claim 7, wherein the terminal device in the limited service state of the LTE network camps on an LTE network cell providing a limited service and establishing only an emergency call bearer with the LTE network.

11. The terminal device of claim 7, wherein to perform the CS voice call process on the non-LTE standard network, the instructions further cause the processor to be configured to perform a CS voice call reply process on the non-LTE standard network.

12. The terminal device of claim 7, wherein the instructions further cause the processor to be configured to return a voice paging response to the non-LTE standard network.

13. A non-transitory computer-readable storage medium comprising instructions which, when executed by a processor of a terminal device, cause the processor to:
receive a voice paging request received from the LTE network, wherein the terminal device is in a limited service state of a long term evolution (LTE) network, wherein the voice paging request is an instruction for the terminal to perform a voice call, and wherein only an emergency call service is supported while the terminal is in the limited service state of the LTE network;
perform a handover from the LTE network to a non-LTE standard network when the terminal device is in the limited service state of the LTE network,
perform a circuit switched (CS) voice call process on the non-LTE standard network.

14. The non-transitory computer-readable storage medium of claim 13, wherein to perform the handover from the LTE network to the non-LTE standard network, the instructions further cause the processor to proactively choose to hand over to an accessible non-LTE standard network, and wherein the instructions further cause the processor to return a voice paging response to the non-LTE standard network.

15. The non-transitory computer-readable storage medium of claim 13, wherein to perform the handover from the LTE network to the non-LTE standard network, the instructions further cause the processor to be configured to:
- send an extended service request to the LTE network; and
- redirect the terminal from the LTE network to an accessible non-LTE standard network according to an instruction of the LTE network, and
- wherein the instructions further cause the processor to return a voice paging response to the non-LTE standard network.

16. The non-transitory computer-readable storage medium of claim 13, wherein the terminal device in the limited service state of the LTE network camps on an LTE network cell providing a limited service and establishing only an emergency call bearer with the LTE network.

17. The non-transitory computer-readable storage medium of claim 13, wherein to perform the CS voice call process on the non-LTE standard network the instructions further cause the processor to perform a CS voice call reply process on the non-LTE standard network.

* * * * *

UNITED STATES PATENT AND TRADEMARK OFFICE
CERTIFICATE OF CORRECTION

| | | |
|---|---|---|
| PATENT NO. | : 10,827,393 B2 | Page 1 of 1 |
| APPLICATION NO. | : 16/051997 | |
| DATED | : November 3, 2020 | |
| INVENTOR(S) | : Bing Sun, Hong Li and Lin Shu | |

It is certified that error appears in the above-identified patent and that said Letters Patent is hereby corrected as shown below:

On the Title Page

(71) Applicant: "HUAWEI TECHNOLOGIES CO., LTD., Guangdong (CN)" should read "HUAWEI TECHNOLOGIES CO., LTD., Shenzhen (CN)"

Signed and Sealed this
Twenty-second Day of December, 2020

Andrei Iancu
*Director of the United States Patent and Trademark Office*